US011491986B2

(12) United States Patent
Hirosawa et al.

(10) Patent No.: US 11,491,986 B2
(45) Date of Patent: Nov. 8, 2022

(54) MOVING BODY CONTROL APPARATUS, MOVING BODY, AND MOVING BODY CONTROL METHOD

(71) Applicant: HONDA MOTOR CO., LTD., Tokyo (JP)

(72) Inventors: Nozomu Hirosawa, Wako (JP); Chihiro Oguro, Wako (JP); Daichi Kato, Wako (JP); Toru Kokaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/200,046

(22) Filed: Mar. 12, 2021

(65) Prior Publication Data

US 2021/0284167 A1 Sep. 16, 2021

(30) Foreign Application Priority Data

Mar. 16, 2020 (JP) .............................. JP2020-044963

(51) Int. Cl.
*B60W 30/18* (2012.01)
*B60W 60/00* (2020.01)
*B62D 15/02* (2006.01)

(52) U.S. Cl.
CPC ... *B60W 30/18163* (2013.01); *B62D 15/0255* (2013.01)

(58) Field of Classification Search
CPC ....... B60W 30/18163; B60W 2552/53; B60W 2554/4045; B60W 60/0027; B60W 30/0956; B60W 50/14; B60W 2050/146; B60W 2554/801; B60W 2555/60; B60W 2720/10; B60W 2720/106; B60W 10/18; B60W 2420/52; B60W 2540/10;

(Continued)

(56) References Cited

U.S. PATENT DOCUMENTS

| 10,131,306 B2 | 11/2018 | Takae et al. | |
| 2018/0086338 A1* | 3/2018 | Yamada | B60W 50/14 |
| 2021/0024067 A1* | 1/2021 | Sudo | B60W 30/14 |

FOREIGN PATENT DOCUMENTS

| JP | 2016-004445 A | 1/2016 |
| WO | 2017/017797 A1 | 2/2017 |
| WO | 2017/199775 A1 | 11/2017 |

OTHER PUBLICATIONS

Office Action dated Jan. 18, 2022 issued over the corresponding Japanese Patent Application No. 2020-044963 with the English translation thereof.

* cited by examiner

*Primary Examiner* — Abby Y Lin
*Assistant Examiner* — Hossam M Abd El Latif
(74) *Attorney, Agent, or Firm* — Carrier Blackman & Associates, P.C.; Joseph P. Carrier; William D. Blackman

(57) ABSTRACT

A moving body control apparatus includes a lane change control section that performs lane change control causing a moving body to perform a lane change from a first lane, in which the moving body is travelling, to a second lane that is adjacent to the first lane, a judging section that judges whether another moving body travelling in the second lane will perform a lane change from the second lane to the first lane, based on vicinity information, and a restriction control section that restricts the lane change of the moving body from the first lane to the second lane when it is judged by the judging section that the other moving body will perform the lane change from the second lane to the first lane.

9 Claims, 5 Drawing Sheets

(58) Field of Classification Search
CPC ............ B60W 2540/18; B60W 10/04; B60W 2420/42; B60W 2520/10; B60W 2520/14; B60W 2540/12; B60W 2554/00; B60W 2556/50; B60W 30/08; B60W 40/06; B62D 15/0255; G05D 1/0293; G05D 2201/0213; G05D 1/0022; G05D 1/0295
USPC .......................................................... 701/1
See application file for complete search history.

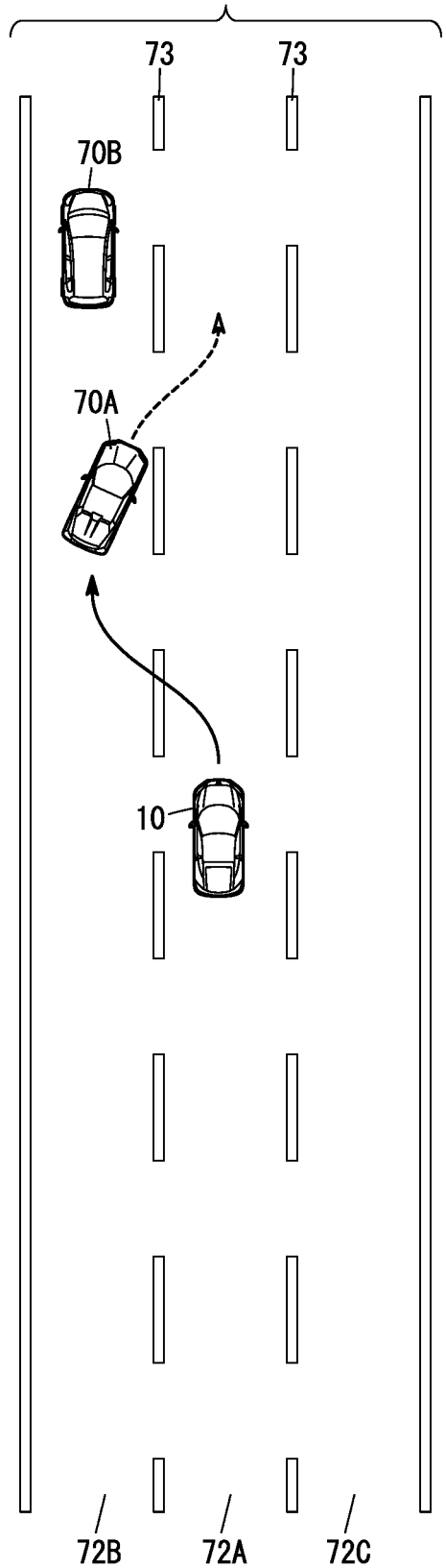
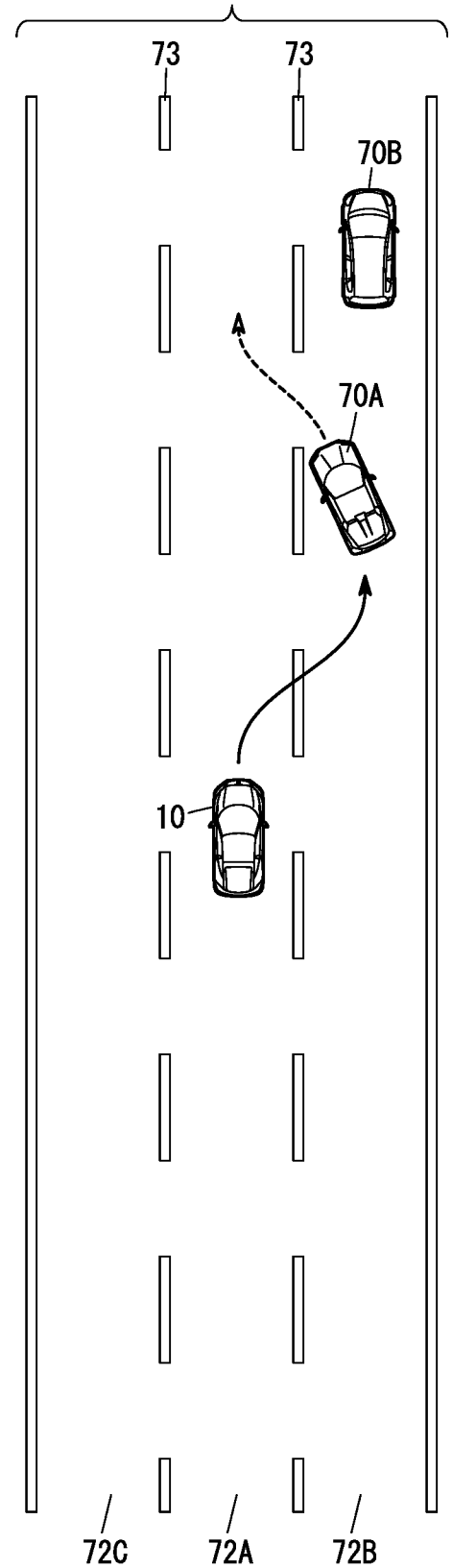

MOVING BODY CONTROL APPARATUS, MOVING BODY, AND MOVING BODY CONTROL METHOD

CROSS-REFERENCE TO RELATED APPLICATION

This application is based upon and claims the benefit of priority from Japanese Patent Application No. 2020-044963 filed on Mar. 16, 2020, the contents of which are incorporated herein by reference.

BACKGROUND OF THE INVENTION

Field of the Invention

The present invention relates to a moving body control apparatus, a moving body, and a moving body control method.

Description of the Related Art

Japanese Laid-Open Patent Publication No. 2016-004445 discloses suspending overtaking control when the preceding vehicle is biased toward the overtaking lane.

SUMMARY OF THE INVENTION

However, in Japanese Laid-Open Patent Publication No. 2016-004445, it is not always possible to accurately restrict the lane change.

The present invention has the objective of providing a moving body control apparatus, a moving body, and a moving body control method that make it possible to accurately restrict a lane change.

A moving body control apparatus according to one aspect of the present invention is a moving body control apparatus comprising a vicinity information acquiring section that acquires vicinity information of a moving body; a lane change control section that performs lane change control causing the moving body to perform a lane change from a first lane, in which the moving body is travelling, to a second lane that is adjacent to the first lane; a judging section that judges whether another moving body travelling in the second lane will perform a lane change from the second lane to the first lane, based on the vicinity information; and a restriction control section that restricts the lane change of the moving body from the first lane to the second lane, when it is judged by the judging section that the another moving body will perform the lane change from the second lane to the first lane.

A moving body according to another aspect of the present invention comprises the moving body control apparatus such as described above.

A moving body control method according to yet another aspect of the present invention comprises a lane change control step of performing lane change control causing a moving body to perform a lane change from a first lane, in which the moving body is travelling, to a second lane that is adjacent to the first lane; a judgment step of judging whether another moving body travelling in the second lane will perform a lane change from the second lane to the first lane, based on vicinity information; and a restriction control step of restricting the lane change of the moving body from the first lane to the second lane when it is judged in the judgment step that the another moving body will perform the lane change from the second lane to the first lane.

According to the present invention, it is possible to provide a moving body control apparatus, a moving body, and a moving body control method that can accurately restrict a lane change.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 3A and 3B are diagrams showing examples of travel lanes;

DESCRIPTION OF THE PREFERRED EMBODIMENTS

Preferred embodiments of a moving body control apparatus, a moving body, and a moving body control method according to the present invention will be presented and described below with reference to the accompanying drawings.

Embodiment

Figure 1:
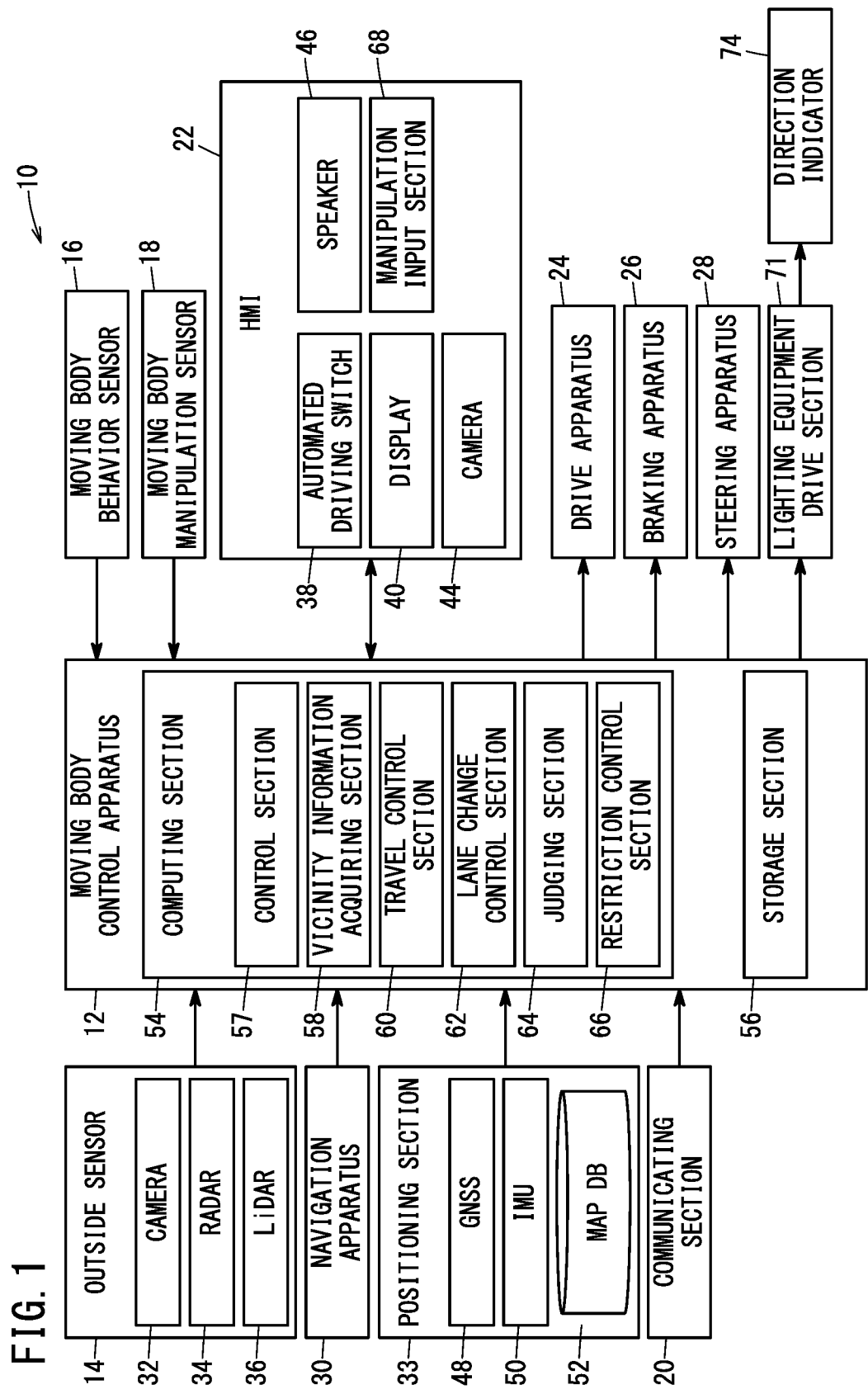
FIG. 1 is a block diagram showing a moving body including a moving body control apparatus according to an embodiment.

A moving body control apparatus, a moving body, and a moving body control method according to an embodiment will be described using drawings. FIG. 1 is a block diagram showing a moving body that includes a moving body control apparatus according to the present embodiment. Here, an example is described of a case in which a moving body 10 is a vehicle, but the moving body 10 is not limited to being a vehicle. For example, the moving body 10 may be a robot or the like.

The moving body 10, i.e. a user vehicle, includes a moving body control apparatus 12, i.e. a moving body control ECU (Electronic Control Unit). The moving body 10 further includes an outside sensor 14, a moving body behavior sensor 16, a moving body manipulation sensor 18, a communicating section 20, and an HMI (Human-Machine Interface) 22. The moving body 10 also includes a drive apparatus 24, a braking apparatus 26, a steering apparatus 28, a navigation apparatus 30, and a positioning section 33. The moving body 10 further includes a lighting equipment drive section 71 and a direction indicator (blinker, turn light, or turn signal light) 74. The moving body 10 includes configurational elements other than the above configurational elements, but descriptions thereof are omitted.

The outside sensor 14 acquires outside information, which is information concerning the area around the moving body 10. The outside sensor 14 includes a plurality of cameras 32 and a plurality of radars 34. The outside sensor 14 also includes a plurality of LiDARs (Light Detection And Ranging, Laser Imaging Detection And Ranging) 36.

The information acquired by the cameras (imaging section) 32, i.e. camera information, is supplied from the cameras 32 to the moving body control apparatus 12. The camera information is captured image information, for example. The camera information forms outside information, together with the radar information and LiDAR information described further below. In FIG. 1, only one camera 32 is shown, but a plurality of cameras 32 are actually included.

Each radar 34 emits a transmission wave toward the outside of the moving body 10, and receives a reflected wave that comes back to the radar 34 when a portion of the emitted transmission wave is reflected by a detection object. The transmission wave may be an electromagnetic wave or the like, for example. The electromagnetic wave is a millimeter wave or the like, for example. The detection object is another moving body 70A and 70B (see FIG. 2A) that is different from the moving body 10, i.e. another vehicle or the like. The radar 34 generates radar information (reflected wave signal) based on the reflected wave or the like. The radar 34 supplies the generated radar information to the moving body control apparatus 12. In FIG. 1, one radar 34 is shown, but a plurality of radars 34 are actually included in the moving body 10. The radars 34 are not limited to being millimeter wave radars. As an example, ultrasonic sensors or the like may be used as the radars 34.

Each LiDAR 36 continuously emits a laser in all directions from the moving body 10, measures the three-dimensional position of a reflection point based on reflected waves resulting from the emitted laser, and outputs information concerning this three-dimensional position, i.e. three-dimensional information. The LiDAR 36 supplies this three-dimensional information, i.e. LiDAR information, to the moving body control apparatus 12. In FIG. 1, one LiDAR 36 is shown, but a plurality of LiDARs 36 are actually included in the moving body 10.

The moving body behavior sensor 16 acquires information concerning the behavior of the moving body 10, i.e. moving body behavior information. The moving body behavior sensor 16 includes a velocity sensor (not shown in the drawings), a wheel velocity sensor (not shown in the drawings), an acceleration sensor (not shown in the drawings), and a yaw rate sensor (not shown in the drawings). The velocity sensor detects the velocity of the moving body 10, i.e. the vehicle velocity. Furthermore, the velocity sensor detects the progression direction of the moving body 10. The wheel velocity sensor detects the velocity of the vehicle wheels (not shown in the drawings), i.e. the wheel velocity. The acceleration sensor detects the acceleration of the moving body 10. The acceleration includes the forward-rear acceleration, the lateral acceleration, and the up-down acceleration. It is acceptable for acceleration in only some of these directions to be detected by the acceleration sensor. The yaw rate sensor detects the yaw rate of the moving body 10.

The moving body manipulation sensor (driving manipulation sensor) 18 acquires information concerning driving manipulations made by an occupant (driver), i.e. driving manipulation information. The moving body manipulation sensor 18 includes an acceleration pedal sensor (not shown in the drawings), a brake pedal sensor (not shown in the drawings), a steering angle sensor (not shown in the drawings), and a steering torque sensor (not shown in the drawings). The acceleration pedal sensor detects the manipulation amount of an acceleration pedal (not shown in the drawings). The brake pedal sensor detects the manipulation amount of a brake pedal (not shown in the drawings). The steering angle sensor detects the steering angle of a steering wheel (not shown in the drawings. The steering torque sensor detects the steering torque applied to the steering torque.

The communicating section 20 performs wireless communication with an external device (not shown in the drawings). The external device can include an external server or the like (not shown in the drawings), for example. The communicating section 20 may be capable or incapable of being attached to and detached from the moving body 10. Examples of the communicating section 20 that is capable of being attached to and detached from the moving body 10 include a mobile telephone, a smartphone, and the like.

The HMI 22 receives the manipulation input made by an occupant, and visually, audibly, or tactilely provides the user with various types of information. The HMI 22 includes an automated driving switch (driving assistance switch) 38, a display 40, a camera 44, a speaker 46, and a manipulation input section 68.

The automated driving switch 38 is a switch with which the occupant issues instructions to start and stop automated driving. The automated driving switch 38 includes a start switch (not shown in the drawings) and a stop switch (not shown in the drawings). The start switch outputs a start signal to the moving body control apparatus 12, in response to a manipulation by the occupant. The stop switch outputs a stop signal to the moving body control apparatus 12, in response to a manipulation by the occupant.

The display (display section) 40 includes a liquid crystal display, organic EL display, or the like, for example. Here, an example is described of a case in which the display 40 is a touch panel, but the display 40 is not limited to this.

The camera 44 captures an image of the inside of the moving body 10, i.e. the inside of the vehicle cabin (not shown in the drawings). Furthermore, the camera 44 can be provided to capture an image of the occupant. The camera 44 may be provided on the dashboard (not shown in the drawings) or on the ceiling (not shown in the drawings), for example. The camera 44 outputs information acquired by capturing the image inside the vehicle cabin, i.e. image information, to the moving body control apparatus 12.

The speaker 46 provides the occupant with various types of information using sound. The moving body control apparatus 12 outputs various notifications, warnings, and the like using the speaker 46.

The manipulation input section 68 enables the occupant to perform manipulation input to issue instructions for a lane change. In a case where a lane change proposal is made by the moving body control apparatus 12, the occupant can indicate whether they agree with this lane change proposal by using the manipulation input section 68. The manipulation input section 68 is a lever-shaped manipulator (not shown in the drawings) for example, but is not limited to this. The manipulation input section 68 is provided on a steering column (not shown in the drawings), for example, but is not limited to this. The manipulation input section 68 can pivot clockwise and counter-clockwise centered on a support shaft, for example. The manipulation input section 68 includes a manipulation position sensor (not shown in the drawings). The manipulation position sensor detects a manipulation position of the manipulation input section 68. The manipulation input section 68 supplies information acquired by the manipulation position sensor, i.e. information concerning the manipulation position of the manipulation input section 68, to the moving body control apparatus 12 described further below.

The drive apparatus (drive force control system) 24 includes a drive ECU (not shown in the drawings) and a drive source (not shown in the drawings). The drive ECU controls the drive force (torque) of the moving body 10 by controlling the drive source. The drive source can be an engine, a drive motor, or the like, for example. The drive ECU can control the drive force by controlling the drive source, based on manipulation of the acceleration pedal performed by the occupant. Furthermore, the drive ECU can control the drive force by controlling the drive source based on instructions supplied from the moving body control apparatus 12. The drive force of the drive source is transmitted to the vehicle wheels (not shown in the drawings) via a transmission or the like (not shown in the drawings).

The braking apparatus (braking force control system) 26 includes a braking ECU (not shown in the drawings) and a braking mechanism (not shown in the drawings). The braking mechanism causes a braking member to operate using a brake motor, hydraulic mechanism, or the like. The braking ECU can control the braking force by controlling the braking mechanism based on a manipulation of the brake pedal made by the occupant. Furthermore, the braking ECU can control the braking force by controlling the braking mechanism based on instructions supplied from the moving body control apparatus 12.

The steering apparatus (steering system) 28 includes a steering ECU (not shown in the drawings), i.e. an EPS (Electric Power Steering) system ECU, and a steering motor (not shown in the drawings). The steering ECU controls the orientation of the wheels (steered wheels) by controlling the steering motor based on a manipulation of the steering wheel, performed by the occupant. Furthermore, the steering ECU controls the orientation of the wheels by controlling the steering motor based on instructions supplied from the moving body control apparatus 12. The steering may be performed by changing the torque distribution and the braking force distribution among the left and right wheels.

The navigation apparatus 30 includes a GNSS (Global Navigation Satellite System) sensor (not shown in the drawings). Furthermore, the navigation apparatus 30 includes a computing section (not shown in the drawings) and a storage section (not shown in the drawings). The GNSS sensor detects the current position of the moving body 10. The computing section reads map information corresponding to the current position detected by the GNSS sensor, from a map database stored in the storage section. The computing section determines a target route from the current position to a destination, using this map information. The destination is input by the occupant via the HMI 22. As described above, the display 40 is a touch panel. The input of the destination is performed by having the occupant manipulate the touch panel. The navigation apparatus 30 outputs the created target route to the moving body control apparatus 12. The moving body control apparatus 12 supplies this target route to the HMI 22. The HMI 22 displays this target route in the display 40.

The positioning section 33 includes a GNSS 48. The positioning section 33 further includes an IMU (Inertial Measurement Unit) 50 and a map database (map DB) 52. The positioning section 33 identifies the position of the moving body 10 using information acquired by the GNSS 48, information acquired by the IMU 50, and the map information stored in the map database 52. The positioning section 33 can supply the moving body control apparatus 12 with self position information that is information indicating the position of the moving body 10, i.e. position information of the moving body 10.

Furthermore, the positioning section 33 can supply the moving body control apparatus 12 with the map information.

The lighting equipment drive section 71 can drive the lighting equipment such as the direction indicator 74.

The moving body control apparatus 12 includes a computing section 54 and a storage section 56. The computing section 54 performs overall control of the moving body control apparatus 12. The computing section 54 can be formed by one or more processors, for example. A CPU (Central Processing Unit) or the like can be used as these processors, for example. The computing section 54 performs the moving body control by controlling each section based on a program stored in the storage section 56.

The computing section 54 includes a control section 57, a vicinity information acquiring section 58, a travel control section 60, a lane change control section 62, a judging section 64, and a restriction control section 66. The control section 57, the vicinity information acquiring section 58, the travel control section 60, the lane change control section 62, the judging section 64, and the restriction control section 66 can be realized by having the computing section 54 execute a program stored in the storage section 56.

The storage section 56 includes a volatile memory (not shown in the drawings) and a non-volatile memory (not shown in the drawings). The volatile memory can be a RAM (Random Access Memory) or the like, for example. The non-volatile memory can be a ROM (Read Only Memory), a flash memory, or the like, for example. The outside information, the moving body behavior information, the driving manipulation information, and the like are stored in the volatile memory, for example. Programs, tables, maps, and the like are stored in the non-volatile memory, for example.

The control section 57 performs overall control of the moving body control apparatus 12.

The vicinity information acquiring section 58 can acquire vicinity information of the moving body 10. This vicinity information can be supplied from the outside sensor 14, for example.

The travel control section 60 can control the travel of the moving body 10. More specifically, the travel control section 60 can control the travel of the moving body 10 based on the vicinity information acquired by the vicinity information acquiring section 58.

The lane change control section 62 can control lane changing of the moving body 10. More specifically, the lane change control section 62 can perform lane change control that causes the moving body 10 travelling in a first lane 72A to make a lane change from this first lane 72A to a second lane 72B that is adjacent to this first lane 72A. The lane change control section 62 can make a lane change proposal to the occupant and perform a lane change if this lane change proposal is accepted by the occupant, but the present invention is not limited to this. The lane change control section 62 may automatically perform a lane change without making a lane change proposal to the occupant. Furthermore, a lane change may be performed based on lane change instructions provided by the occupant. Before performing the lane change from the first lane 72A to the second lane 72B, the lane change control section 62 can notify the occupant of the moving body 10 that the lane change will be performed and also start the operation of the direction indicator 74 included in the moving body 10. This notification can be performed using the display 40, the speaker 46, and the like, for example.

The judging section 64 can judge whether another moving body 70A (see FIG. 2A), which is travelling in the second lane 72B (see FIG. 2A) that is adjacent to the first lane 72A (see FIG. 2A) in which the moving body 10 is travelling, will perform a lane change from the second lane 72B to the first lane 72A. The judging section 64 can judge whether the other moving body 70A will perform the lane change from the second lane 72B to the first lane 72A based on the vicinity information. The judging section 64 can judge whether another moving body 70A (see FIG. 3A) travelling behind the moving body 10 will perform a lane change from the second lane 72B to the first lane 72A. The judging section 64 can judge whether another moving body 70A (see FIG. 2B) travelling behind the moving body 10 will perform a lane change from the second lane 72B to the first lane 72A. Here, examples are described of cases in which the other moving body 70A is another vehicle, but the present invention is not limited to this. The other moving body 70A may be a robot or the like.

If a portion of the other moving body 70A travelling in the second lane 72B is positioned on a lane marker 73, which is a boundary line between this second lane 72B and the first lane 72A, the judging section 64 can judge that the other moving body 70A will perform the lane change from the second lane 72B to the first lane 72A. Furthermore, the judging section 64 can judge that the other moving body 70A will perform the lane change from the second lane 72B to the first lane 72A based on the lighting up of a direction indicator included in the other moving body 70A. Yet further, the judging section 64 can judge that the other moving body 70A will perform the lane change from the second lane 72B to the first lane 72A based on information supplied from the other moving body 70A via inter-moving-body communication or the like, namely, information indicating a scheduled travel trajectory of the other moving body 70.

The "judgment" made by the judging section 64 can include an "estimation" such as described below. For example, even when the other moving body 70A is positioned within the second lane 72B, if the other moving body 70A has moved at least a prescribed amount in a direction from the second lane 72B toward the first lane 72A, the judging section 64, i.e. an estimating section, can perform a process such as follows. Specifically, in such a case, the judging section 64, i.e. the estimating section, can estimate that the other moving body 70A will perform the lane change from the second lane 72B to the first lane 72A. Furthermore, the judging section 64, i.e. the estimating section, can estimate that the other moving body 70A will perform the lane change from the second lane 72B to the first lane 72A based on an angle formed between the progression direction of the other moving body 70A and the longitudinal direction of the second lane 72B. For example, in a case where the first lane 72A is positioned on the right side of the second lane 72B relative to the progression direction, when the angle formed between the progression direction of the other moving body 70A and the longitudinal direction of the second lane 72B is a clockwise angle of at least a prescribed angle, an estimation such as described below can be performed. Specifically, in such a case, the judging section 64, i.e. the estimating section, can estimate that the other moving body 70A will perform the lane change from the second lane 72B to the first lane 72A. As another example, in a case where the first lane 72A is positioned on the left side of the second lane 72B relative to the progression direction, when the angle formed between the progression direction of the other moving body 70A and the longitudinal direction of the second lane 72B is a counter-clockwise angle of at least a prescribed angle, an estimation such as described below can be performed. Specifically, in such a case, the judging section 64, i.e. the estimating section, can estimate that the other moving body 70A will perform the lane change from the second lane 72B to the first lane 72A.

The judging section 64 can further estimate whether the other moving body 70A is expected to be positioned in front of or behind the moving body 10 after the other moving body 70A has performed the lane change from the second lane 72B to the first lane 72A. If the judging section 64 estimates that the other moving body 70A is expected to be positioned in front of the moving body 10 after the other moving body 70A has performed the lane change from the second lane 72B to the first lane 72A, the restriction control section 66 can perform control such as described below. Specifically, in such a case, if the lane change of the moving body 10 has not reached a first progress level, the restriction control section 66 can restrict the lane change of the moving body 10 from the first lane 72A to the second lane 72B. If the judging section 64 estimates that the other moving body 70A is expected to be positioned behind the moving body 10 after the other moving body 70A has performed the lane change from the second lane 72B to the first lane 72A, the restriction control section 66 can perform control such as described below. Specifically, in such a case, if the lane change of the moving body 10 has not reached a second progress level, which is higher than the first progress level, the restriction control section 66 restricts the lane change of the moving body 10 from the first lane 72A to the second lane 72B.

When it is judged by the judging section 64 that the other moving body 70A will perform the lane change from the second lane 72B to the first lane 72A, the restriction control section 66 can restrict the lane change of the moving body 10 from the first lane 72A to the second lane 72B. Specifically, in such a case, the restriction control section 66 cancels or postpones the lane change of the moving body 10 from the first lane 72A to the second lane 72B. If the lane change is cancelled or postponed after the occupant of the moving body 10 has been notified that the lane change will be performed, the restriction control section 66 can notify the occupant of the moving body 10 that the lane change is cancelled or postponed. However, in a case where the lane change can be restarted within a prescribed time, this notification does not need to be provided. Furthermore, if the lane change is cancelled or postponed after the operation of the direction indicator 74 included in the moving body 10 has been started, the restriction control section 66 can notify the occupant of the moving body 10 that the lane change is cancelled or postponed. Here as well, in a case where the lane change can be restarted within the prescribed time, this notification does not need to be provided.

Figure 2A:
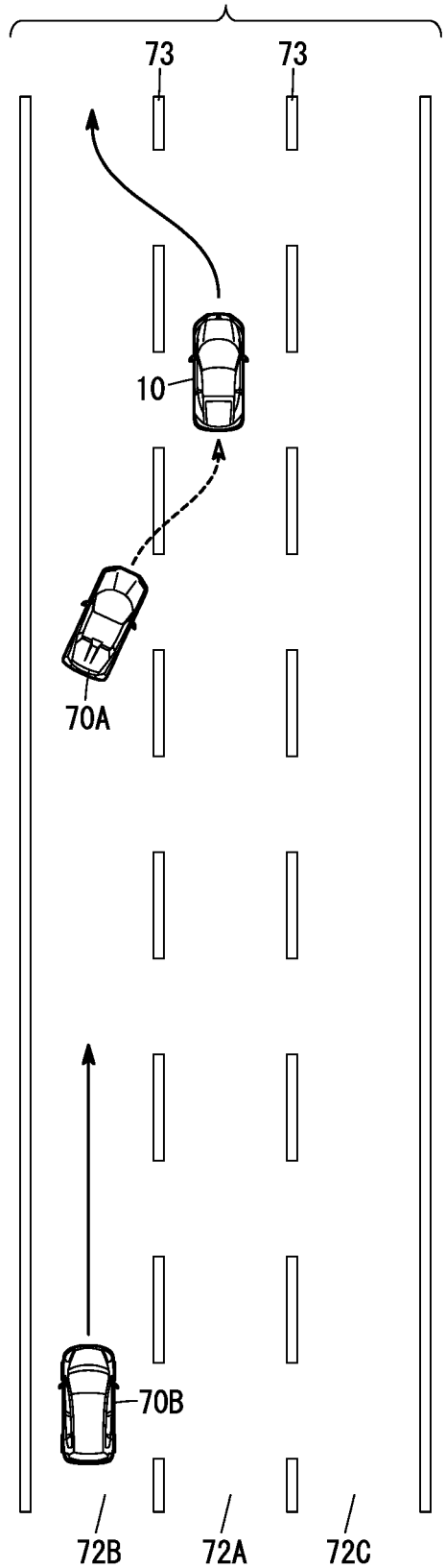
FIGS. 2A and 2B are diagrams showing examples of travel lanes.

FIG. 2A is a diagram showing am example of travel lanes. The first lane 72A, the second lane 72B, and a third lane 72C are shown in FIG. 2A. When describing the lanes in general, the reference numeral 72 is used, and when describing the lanes individually, the reference numerals 72A to 72C are used. The second lane 72B is an adjacent lane positioned on one side of the first lane 72A. The third lane 72C is an adjacent lane positioned on the other side of the first lane 72A. In the example shown in FIG. 2A, the second lane 72B is positioned on the left side of the first lane 72A relative to the progression direction, and the third lane 72C is positioned on the right side of the first lane 72A relative to the progression direction. An example of a case in which the other moving body 70A positioned behind the moving body 10 is attempting to perform a lane change from the second lane 72B to the first lane 72A is shown in FIG. 2A. In such a case, it is possible that, for example, another moving body 70B travelling in the second lane 72B at a higher velocity than the moving body 10 is approaching the other moving body 70A from behind. Furthermore, there is a possibility that the other moving body 70B is being blocked by the other moving body 70A, such that the other moving body 70B cannot be detected by the outside sensor 14 included in the moving body 10. In such a case, it is preferable to restrict the lane change of the moving body 10 from the first lane 72A to the second lane 72B. In such a case, the lane change of the moving body 10 from the first lane 72A to the second lane 72B can be cancelled or postponed. At the stage where it has become possible for the region behind the other moving body 70A to be recognized by the outside sensor 14 included in the moving body 10, if it can be confirmed that another moving body travelling in the second lane 72B is not present behind the other moving body 70A, the following may be performed. Specifically, in such a case, even though the other moving body 70A is currently performing the lane change from the second lane 72B to the first lane 72A, the lane change of the moving body 10 may be performed without being cancelled or postponed. Furthermore, an example is described here of a case in which the other moving body 70B is another vehicle, but the present invention is not limited to this. The other moving body 70B may be a robot or the like.

Figure 2B:
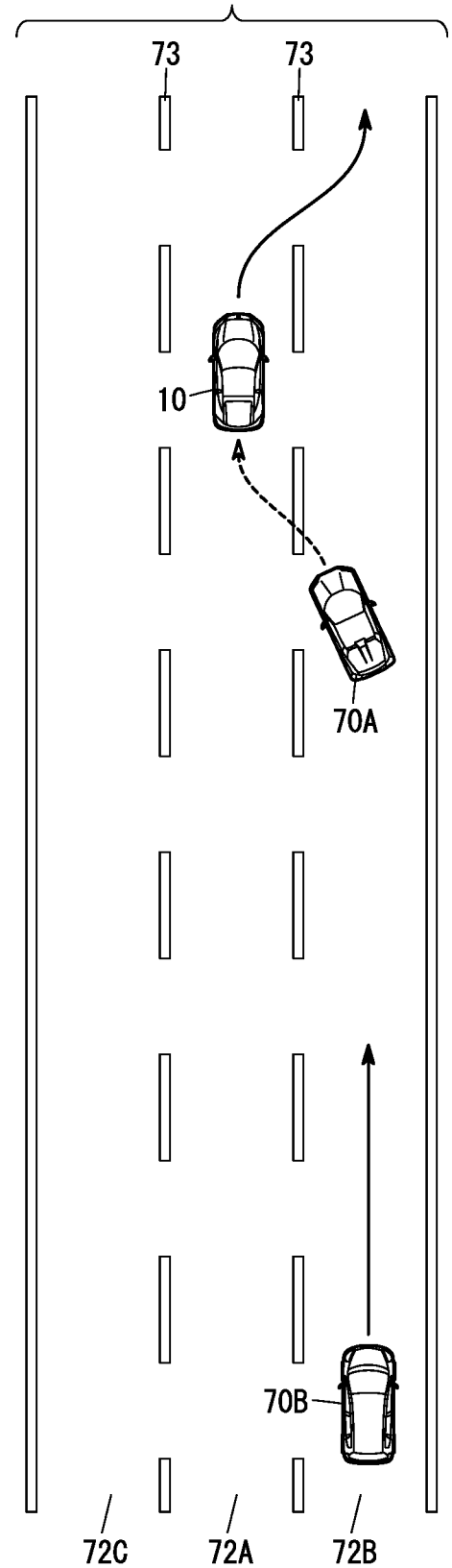

FIG. 2B is a diagram showing an example of travel lanes. In the example of FIG. 2B, the second lane 72B is positioned on the right side of the first lane 72A relative to the progression direction, and the third lane 72C is positioned on the left side of the first lane 72A relative to the progression direction. An example of a case in which the other moving body 70A positioned behind the moving body 10 is attempting to perform a lane change from the second lane 72B to the first lane 72A is shown in FIG. 2B. In such a case, it is possible that, for example, another moving body 70B travelling in the second lane 72B at a higher velocity than the moving body 10 is approaching the other moving body 70A from behind. In such a case, it is preferable to restrict the lane change of the moving body 10 from the first lane 72A to the second lane 72B. In such a case, the lane change of the moving body 10 from the first lane 72A to the second lane 72B can be cancelled or postponed.

FIG. 3A is a diagram showing an example of travel lanes. In the example of FIG. 3A, the second lane 72B is positioned on the left side of the first lane 72A relative to the progression direction, and the third lane 72C is positioned on the right side of the first lane 72A relative to the progression direction. An example of a case in which the other moving body 70A positioned in front of the moving body 10 is attempting to perform a lane change from the second lane 72B to the first lane 72A is shown in FIG. 3A. In such a case, it is possible that, for example, the other moving body 70A is approaching another moving body 70B that is stopping in the second lane 72B. In such a case, it is preferable to restrict the lane change of the moving body 10 from the first lane 72A to the second lane 72B. In such a case, the lane change of the moving body 10 from the first lane 72A to the second lane 72B can be cancelled or postponed.

FIG. 3B is a diagram showing an example of travel lanes. In the example of FIG. 3B, the second lane 72B is positioned on the right side of the first lane 72A relative to the progression direction, and the third lane 72C is positioned on the left side of the first lane 72A relative to the progression direction. An example of a case in which the other moving body 70A positioned in front of the moving body 10 is attempting to perform a lane change from the second lane 72B to the first lane 72A is shown in FIG. 3B. In such a case, it is possible that, for example, the other moving body 70A is approaching another moving body 70B that is stopping in the second lane 72B. In such a case, it is preferable to restrict the lane change of the moving body 10 from the first lane 72A to the second lane 72B. In such a case, the lane change of the moving body 10 from the first lane 72A to the second lane 72B can be cancelled or postponed.

When the lane change control is being performed, if it is judged by the judging section 64 that the other moving body 70A positioned behind the moving body 10 will perform the lane change from the second lane 72B to the first lane 72A, the restriction control section 66 can perform control such as described below. Specifically, in such a case, if the lane change of the moving body 10 has not reached the first progress level (first degree), the restriction control section 66 can restrict the lane change of the moving body 10 from the first lane 72A to the second lane 72B. The first progress level is a stage at which the occupant of the moving body 10 is notified that the lane change will be performed or a stage at which the operation of the direction indicator 74 included in the moving body 10 is started, for example. In other words, when it is judged by the judging section 64 that the other moving body 70A positioned behind the moving body 10 will perform the lane change from the second lane 72B to the first lane 72A, if the lane change has reached a certain progression level, the following occurs. Specifically, in such a case, the lane change of the moving body 10 from the first lane 72A to the second lane 72B is not restricted. As described above, the first progress level can correspond to a certain stage, i.e. a certain degree, but is not limited to this. The first progress level may be calculated as a numerical value.

When the lane change control is being performed, if it is judged by the judging section 64 that the other moving body 70A positioned in front of the moving body 10 will perform the lane change from the second lane 72B to the first lane 72A, the restriction control section 66 can perform control such as described below. Specifically, in such a case, if the lane change of the moving body 10 has not reached the second progress level (second degree) that is higher than the first progress level, the restriction control section 66 can restrict the lane change of the moving body 10 from the first lane 72A to the second lane 72B. The second progress level is a stage at which the moving body 10 is positioned on the lane marker 73 that is a boundary line between the first lane 72A and the second lane 72B, for example. In other words, when it is judged by the judging section 64 that the other moving body 70A positioned in front of the moving body 10 will perform the lane change from the second lane 72B to the first lane 72A, even if the progression level of the lane change has increased to some extent, the following occurs. Specifically, in such a case, the lane change of the moving body 10 from the first lane 72A to the second lane 72B is restricted. As described above, the second progress level can correspond to a certain stage, i.e. a certain degree, but is not limited to this. The second progress level may be calculated as a numerical value.

The reason for making the conditions for restricting the lane change differ according to whether the other moving body 70A attempting to perform the lane change from the second lane 72B to the first lane 72A is positioned in front of or behind the moving body 10 are as shown below. Specifically, when the other moving body 70A positioned behind the moving body 10 performs a lane change from the second lane 72B to the first lane 72A, the relative velocity between the moving body 10 and the other moving body 70B approaching the other moving body 70A from behind is relatively small. On the other hand, when the other moving body 70A positioned in front of the moving body 10 performs a lane change from the second lane 72B to the first lane 72A, the relative velocity between the moving body 10 and the other moving body 70B stopping in front the other moving body 70A is relatively large. When the relative velocity between the moving body 10 and the other moving body 70B is relatively large, even if the progress level of the lane change of the moving body 10 has increased to some extent, it is preferable to restrict the lane change of the moving body 10 from the first lane 72A to the second lane 72B. Due to such a reason, in the present embodiment, the conditions for restricting the lane change are made to differ according to whether the other moving body 70A attempting to perform the lane change from the second lane 72B to the first lane 72A is positioned in front of or behind the moving body 10.

Figure 4:
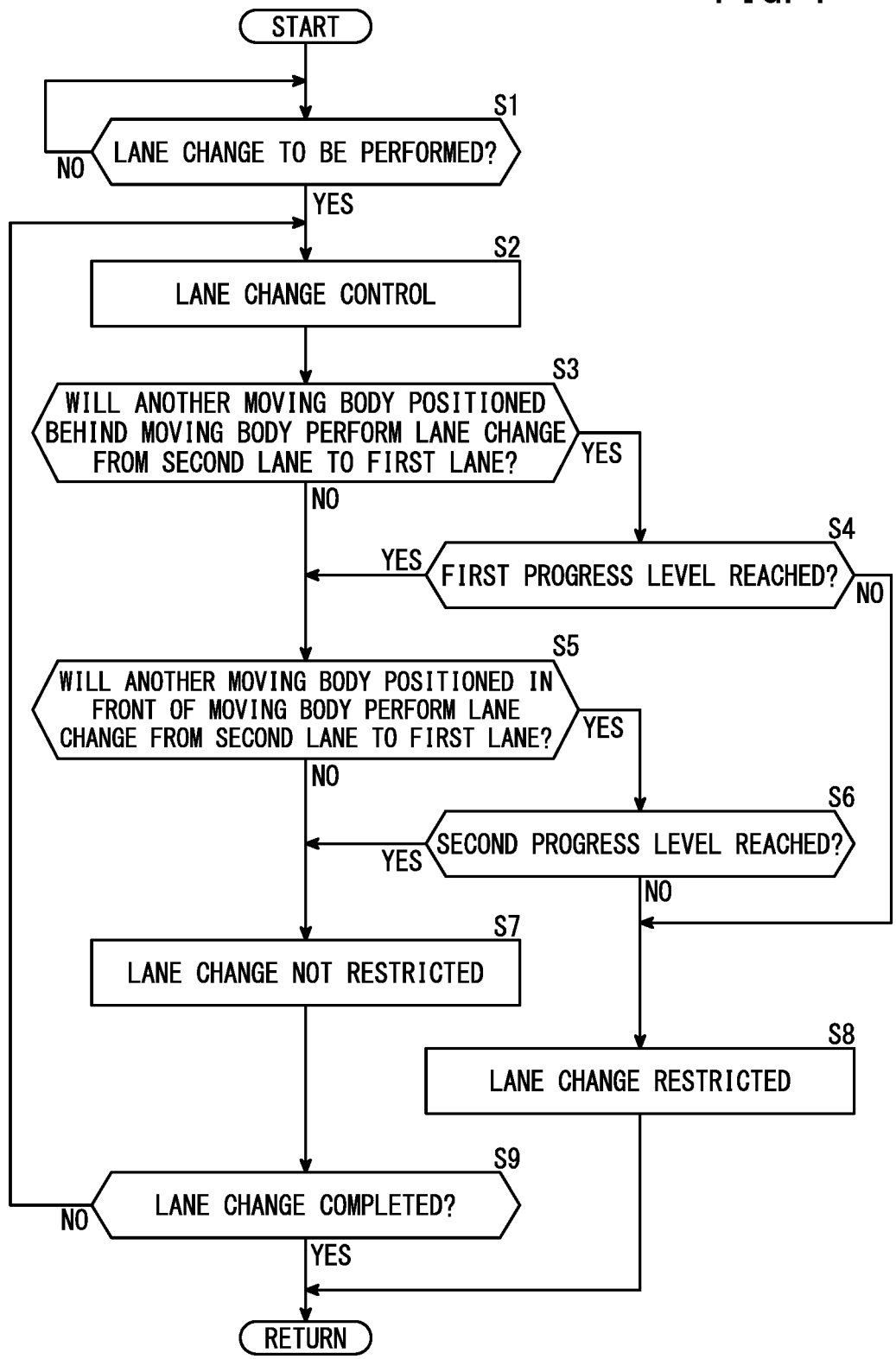
FIG. 4 is a flow chart showing an example of an operation of the moving body control apparatus according to an embodiment.

FIG. 4 is a flow chart showing an example of an operation of the moving body control apparatus according to the present embodiment. An operation performed when a lane change is performed is shown in FIG. 4.

At step S1, the control section 57 judges whether the lane change is to be performed. If the lane change is to be performed (YES at step S1), the process moves to step S2. If the lane change is not to be performed (NO at step S1), step S1 is repeated.

At step S2, the lane change control section 62 performs the lane change control. After this, the process moves to step S3.

At step S3, the judging section 64 judges whether the other moving body 70A positioned behind the moving body 10 will perform a lane change from the second lane 72B to the first lane 72A. If it is judged by the judging section 64 that the other moving body 70A positioned behind the moving body 10 will perform the lane change from the second lane 72B to the first lane 72A (YES at step S3), the process moves to step S4. If it is judged by the judging section 64 that the other moving body 70A positioned behind the moving body 10 will not perform the lane change from the second lane 72B to the first lane 72A (NO at step S3), the process moves to step S5.

At step S4, the restriction control section 66 judges whether the lane change of the moving body 10 has reached the first progress level. If the lane change of the moving body 10 has reached the first progress level (YES at step S4), the process moves to step S5. If the lane change of the moving body 10 has not reached the first progress level (NO at step S4), the process moves to step S8.

At step S5, the judging section 64 judges whether the other moving body 70A positioned in front of the moving body 10 will perform a lane change from the second lane 72B to the first lane 72A. If it is judged by the judging section 64 that the other moving body 70A positioned in front of the moving body 10 will perform the lane change from the second lane 72B to the first lane 72A (YES at step S5), the process moves to step S6. If it is judged by the judging section 64 that the other moving body 70A positioned in front of the moving body 10 will not perform the lane change from the second lane 72B to the first lane 72A (NO at step S5), the process moves to step S7.

At step S6, the restriction control section 66 judges whether the lane change of the moving body 10 has reached the second progress level. If the lane change of the moving body 10 has reached the second progress level (YES at step S6), the process moves to step S7. If the lane change of the moving body 10 has not reached the second progress level (NO at step S6), the process moves to step S8.

At step S7, the restriction control section 66 does not restrict the lane change of the moving body 10 from the first lane 72A to the second lane 72B. After this, the process moves to step S9.

At step S8, the restriction control section 66 restricts the lane change of the moving body 10 from the first lane 72A to the second lane 72B. When step S8 has been performed, the process shown in FIG. 4 ends.

At step S9, the control section 57 judges whether the lane change has been completed. If the lane change has not been completed (NO at step S9), the processing from S2 onward is repeated. If the lane change has been completed (YES at step S9), the process shown in FIG. 4 ends.

Figure 5:
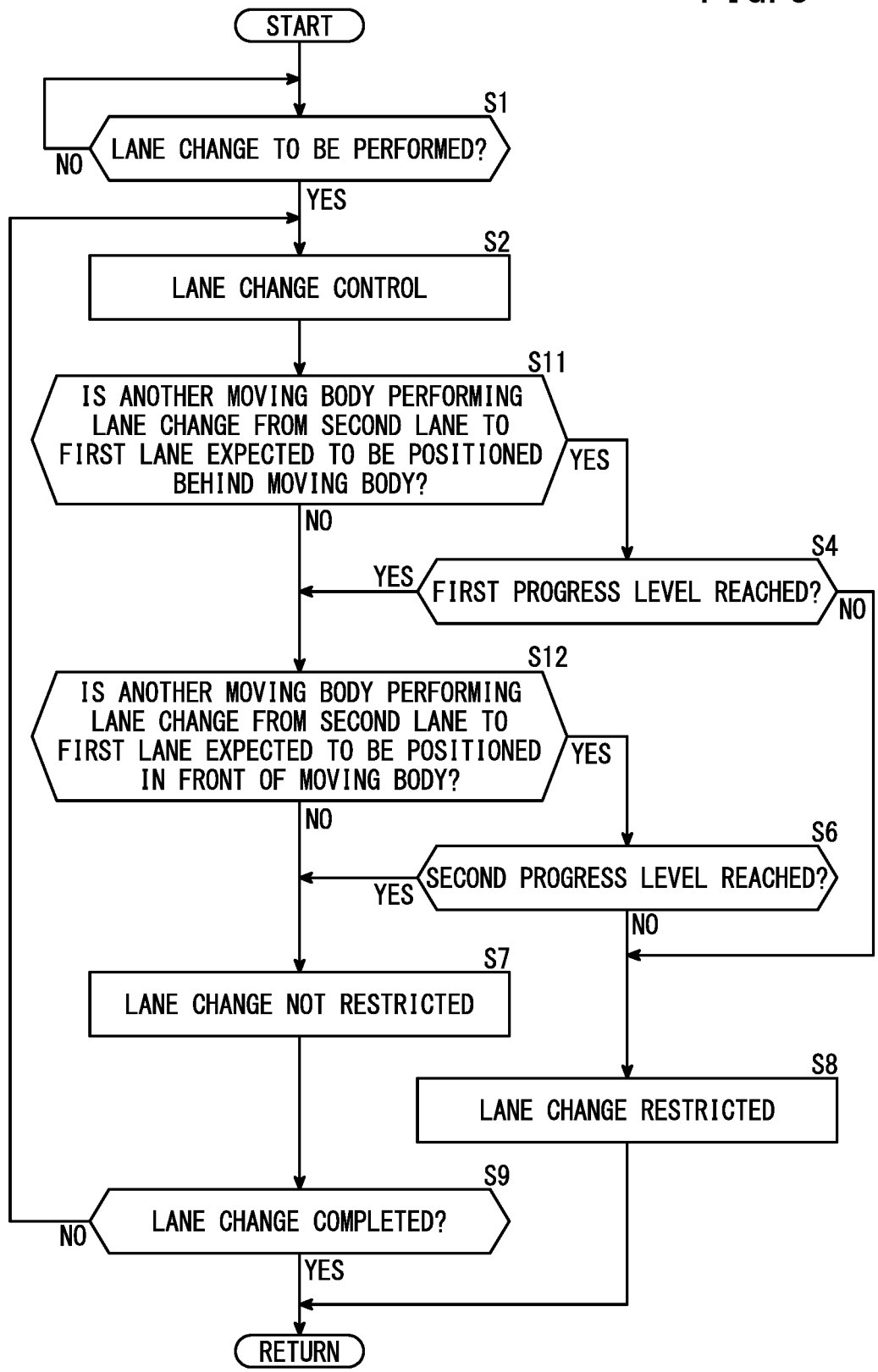
FIG. 5 is a flow chart showing an example of an operation of the moving body control apparatus according to an embodiment.

FIG. 5 is a flow chart showing an example of an operation of the moving body control apparatus according to the present embodiment. An operation performed when a lane change is performed is shown in FIG. 5.

Steps S1 and S2 are the same as steps S1 and S2 described above using FIG. 4, and therefore descriptions thereof are omitted. When step S2 is completed, the process moves to step S11.

At step S11, the judging section 64 judges whether the other moving body 70A performing the lane change from the second lane 72B to the first lane 72A is expected to be positioned behind the moving body 10. If the other moving body 70A performing the lane change from the second lane 72B to the first lane 72A is expected to be positioned behind the moving body 10 (YES at step S11), the process moves to step S4. If the other moving body 70A performing the lane change from the second lane 72B to the first lane 72A is not expected to be positioned behind the moving body 10 (NO at step S11), the process moves to step S12.

Step S4 is the same as step S4 described above using FIG. 4, and therefore a description thereof is omitted. If the lane change of the moving body 10 has reached the first progress level (YES at step S4), the process moves to step S12. If the lane change of the moving body 10 has not reached the first progress level (NO at step S4), the process moves to step S8.

At step S12, the judging section 64 judges whether the other moving body 70A performing the lane change from the second lane 72B to the first lane 72A is expected to be positioned in front of the moving body 10. If the other moving body 70A performing the lane change from the second lane 72B to the first lane 72A is expected to be positioned in front of the moving body 10 (YES at step S12), the process moves to step S6. If the other moving body 70A performing the lane change from the second lane 72B to the first lane 72A is not expected to be positioned in front of the moving body 10 (NO at step S12), the process moves to step S7.

Steps S6 to S9 are the same as steps S6 to S9 described above using FIG. 4, and therefore descriptions thereof are omitted. After this, the process shown in FIG. 5 ends.

In this way, according to the present embodiment, when it is judged by the judging section 64 that the other moving body 70A will perform a lane change from the second lane 72B to the first lane 72A, the lane change of the moving body 10 from the first lane 72A to the second lane 72B is restricted. When the other moving body 70A performs the lane change from the second lane 72B to the first lane 72A, there is a possibility that another moving body 70B approaching the other moving body 70A from behind is travelling in the second lane 72B. Furthermore, when the other moving body 70A performs the lane change from the second lane 72B to the first lane 72A, there is a possibility that another moving body 70B stopping in the second lane 72B is positioned in front of the other moving body 70A. In such cases, the field of view is obstructed by the other moving body 70A, and it is possible that the other moving body 70B cannot be seen from the moving body 10. According to the present embodiment, since the lane change of the moving body 10 from the first lane 72A to the second lane 72B is restricted in such cases, it is possible to provide the moving body control apparatus 12 that can accurately restrict the lane change.

Preferred embodiments of the present invention are described above, but the present invention is not limited to the above-described embodiments, and various alterations can be adopted therein without departing from the scope of the present invention.

As an example, whether or not the occupant is gripping the steering wheel may be further taken into consideration. For example, in a state where the occupant is not gripping the steering wheel, if it is judged by the judging section 64 that the other moving body 70A positioned behind the moving body 10 will perform a lane change from the second lane 72B to the first lane 72A, the restriction control section 66 may perform control such as described below. Specifically, in such a case, if the lane change of the moving body 10 has not reached a third progress level that is lower than the first progress level, the restriction control section 66 may restrict the lane change of the moving body 10 from the first lane 72A to the second lane 72B. Here, the judgment as to whether the occupant is gripping the steering wheel can be made based on information supplied from a grip sensor (not shown in the drawings) included in the moving body 10.

The following is a summary of the embodiments described above.

A moving body control apparatus (12) comprises a vicinity information acquiring section (58) that acquires vicinity information of a moving body (10); a lane change control section (62) that performs lane change control causing the moving body to perform a lane change from a first lane (72A), in which the moving body is travelling, to a second lane (72B) that is adjacent to the first lane; a judging section (64) that judges whether another moving body (70A) travelling in the second lane will perform a lane change from the second lane to the first lane, based on the vicinity information; and a restriction control section (66) that restricts the lane change of the moving body from the first lane to the second lane, when it is judged by the judging section that the other moving body will perform the lane change from the second lane to the first lane. According to such a configuration, when it is judged by the judging section that the other moving body will perform the lane change from the second lane to the first lane, the lane change of the moving body from the first lane to the second lane is restricted. When the other moving body performs the lane change from the second lane to the first lane, there is a possibility that yet another moving body approaching the other moving body from behind is travelling in the second lane. Furthermore, when the other moving body performs the lane change from the second lane to the first lane, there is a possibility that yet another moving body is stopping in the second lane. In such cases, the field of view can be blocked by the other moving body attempting to perform the lane change from the second lane to the first lane, such that the yet another moving body cannot be seen from the moving body. According to the configuration described above, in such a case, the lane change of the moving body from the first lane to the second lane is restricted, and therefore it is possible to provide the moving body control apparatus that can accurately restrict the lane change.

During performance of the lane change control, when it is judged that the other moving body positioned behind the moving body will perform the lane change from the second lane to the first lane, the restriction control section may restrict the lane change of the moving body from the first lane to the second lane if the lane change of the moving body has not reached a first progress level; and during performance of the lane change control, when it is judged that the other moving body positioned in front of the moving body will perform the lane change from the second lane to the first lane, the restriction control section may restrict the lane change of the moving body from the first lane to the second lane if the lane change of the moving body has not reached a second progress level that is higher than the first progress level. According to such a configuration, when the other moving body positioned in front of the moving body performs the lane change from the second lane to the first lane, even if the progression level of the lane change of the moving body has increased to some extent, the lane change of the moving body from the first lane to the second lane is restricted. When yet another moving body is stopping in front of the other moving body positioned in front of the moving body, the relative velocity between the moving body and the yet another moving body that is stopping is relatively large, and therefore, it is preferable to restrict the lane change of the moving body from the first lane to the second lane even when the progression level of the lane change of the moving body has increased to some extent. Therefore, according to the configuration described above, it is possible to provide the moving body control apparatus that can more accurately restrict the lane change.

The judging section may estimate whether the other moving body is expected to be positioned in front of or behind the moving body after the other moving body has performed the lane change from the second lane to the first lane; when it is estimated that the other moving body is expected to be positioned behind the moving body after the other moving body has performed the lane change from the second lane to the first lane, the restriction control section may restrict the lane change of the moving body from the first lane to the second lane if the lane change of the moving body has not reached a first progress level; and when it is estimated that the other moving body is expected to be positioned in front of the moving body after the other moving body has performed the lane change from the second lane to the first lane, the restriction control section may restrict the lane change of the moving body from the first lane to the second lane if the lane change of the moving body has not reached a second progress level that is higher than the first progress level.

The lane change control section may notify an occupant of the moving body that the lane change will be performed and to start operation of a direction indicator (74) included in the moving body, before performing the lane change from the first lane to the second lane; and the first progress level may be a stage at which the occupant has been notified that the lane change will be performed or a stage at which the operation of the direction indicator is started.

The second progress level may be a stage at which the moving body is positioned on a lane marker, which is a boundary line between the first lane and the second lane, after the lane change from the first lane to the second lane has been started by the lane change control section.

A moving body (10) comprises the moving body control apparatus such as described above.

A moving body control method comprises a lane change control step (S2) of performing lane change control causing a moving body to perform a lane change from a first lane, in which the moving body is travelling, to a second lane that is adjacent to the first lane; a judgment step (S3, S5) of judging whether another moving body travelling in the second lane will perform a lane change from the second lane to the first lane, based on vicinity information; and a restriction control step (S8) of restricting the lane change of the moving body from the first lane to the second lane when it is judged in the judgment step that the other moving body will perform the lane change from the second lane to the first lane.

In the restriction control step, during performance of the lane change control, when it is judged, based on the vicinity information, that the other moving body positioned behind the moving body will perform the lane change from the second lane to the first lane, the lane change of the moving body from the first lane to the second lane may be restricted if the lane change of the moving body has not reached a first progress level (S4), and during performance of the lane change control, when it is judged, based on the vicinity information, that the other moving body positioned in front of the moving body will perform the lane change from the second lane to the first lane, the lane change of the moving body from the first lane to the second lane may be restricted if the lane change of the moving body has not reached a second progress level that is higher than the first progress level (S6).

In the judgment step, it may be estimated whether the other moving body is expected to be positioned in front of or behind the moving body after the other moving body has performed the lane change from the second lane to the first lane; in the restriction control step, when it is estimated in the judgment step that the other moving body is expected to be positioned behind the moving body after the other moving body has performed the lane change from the second lane to the first lane, the lane change of the moving body from the first lane to the second lane may be restricted if the lane change of the moving body has not reached a first progress level; and in the restriction control step, when it is estimated in the judgment step that the other moving body is expected to be positioned in front of the moving body after the other moving body has performed the lane change from the second lane to the first lane, the lane change of the moving body from the first lane to the second lane may be restricted if the lane change of the moving body has not reached a second progress level that is higher than the first progress level.

What is claimed is:

1. A moving body control apparatus comprising one or more processors that execute computer-executable instructions stored in a memory, wherein
    the one or more processors execute the computer-executable instructions to cause the moving body control apparatus to:
    acquire vicinity information of a moving body;
    perform lane change control causing the moving body to perform a lane change from a first lane, in which the moving body is travelling, to a second lane that is adjacent to the first lane;
    judge whether another moving body travelling in the second lane will perform a lane change from the second lane to the first lane, based on the vicinity information; and
    restrict the lane change of the moving body from the first lane to the second lane, when it is judged that the another moving body will perform the lane change from the second lane to the first lane.

2. The moving body control apparatus according to claim 1, wherein
    during performance of the lane change control, when it is judged that the another moving body positioned behind the moving body will perform the lane change from the second lane to the first lane, the one or more processors cause the moving body control apparatus to restrict the lane change of the moving body from the first lane to the second lane if the lane change of the moving body has not reached a first progress level, and
    during performance of the lane change control, when it is judged that the another moving body positioned in front of the moving body will perform the lane change from the second lane to the first lane, the one or more processors cause the moving body control apparatus to restrict the lane change of the moving body from the first lane to the second lane if the lane change of the moving body has not reached a second progress level that is higher than the first progress level.

3. The moving body control apparatus according to claim 1, wherein
    the one or more processors cause the moving body control apparatus to estimate whether the another moving body is expected to be positioned in front of or behind the moving body after the another moving body has performed the lane change from the second lane to the first lane,
    when it is estimated that the another moving body is expected to be positioned behind the moving body after the another moving body has performed the lane change from the second lane to the first lane, the one or more processors cause the moving body control apparatus to restrict the lane change of the moving body from the first lane to the second lane if the lane change of the moving body has not reached a first progress level, and
    when it is estimated that the another moving body is expected to be positioned in front of the moving body after the another moving body has performed the lane change from the second lane to the first lane, the one or more processors cause the moving body control apparatus to restrict the lane change of the moving body from the first lane to the second lane if the lane change of the moving body has not reached a second progress level that is higher than the first progress level.

4. The moving body control apparatus according to claim 2, wherein
    the one or more processors cause the moving body control apparatus to notify an occupant of the moving body that the lane change will be performed and to start operation of a direction indicator included in the moving body, before performing the lane change from the first lane to the second lane, and
    the first progress level is a stage at which the occupant has been notified that the lane change will be performed or a stage at which the operation of the direction indicator is started.

5. The moving body control apparatus according to claim 2, wherein
    the second progress level is a stage at which the moving body is positioned on a lane marker, which is a boundary line between the first lane and the second lane, after the lane change from the first lane to the second lane has started.

6. A moving body comprising a moving body control apparatus, the moving body control apparatus comprising one or more processors that execute computer-executable instructions stored in a memory, wherein
the one or more processors execute the computer-executable instructions to cause the moving body control apparatus to:
acquire vicinity information of a moving body;
perform lane change control causing the moving body to perform a lane change from a first lane, in which the moving body is travelling, to a second lane that is adjacent to the first lane;
judge whether another moving body travelling in the second lane will perform a lane change from the second lane to the first lane, based on the vicinity information; and
restrict the lane change of the moving body from the first lane to the second lane, when it is judged that the another moving body will perform the lane change from the second lane to the first lane.

7. A moving body control method comprising:
performing lane change control causing a moving body to perform a lane change from a first lane, in which the moving body is travelling, to a second lane that is adjacent to the first lane;
judging whether another moving body travelling in the second lane will perform a lane change from the second lane to the first lane, based on vicinity information; and
restricting the lane change of the moving body from the first lane to the second lane when it is judged, in the judging of the lane change of the another moving body, that the another moving body will perform the lane change from the second lane to the first lane.

8. The moving body control method according to claim 7, wherein
in the restricting of the lane change of the moving body, during performance of the lane change control, when it is judged, based on the vicinity information, that the another moving body positioned behind the moving body will perform the lane change from the second lane to the first lane, the lane change of the moving body from the first lane to the second lane is restricted if the lane change of the moving body has not reached a first progress level, and during performance of the lane change control, when it is judged, based on the vicinity information, that the another moving body positioned in front of the moving body will perform the lane change from the second lane to the first lane, the lane change of the moving body from the first lane to the second lane is restricted if the lane change of the moving body has not reached a second progress level that is higher than the first progress level.

9. The moving body control method according to claim 7, wherein
the judging of the lane change of the another moving body includes estimating whether the another moving body is expected to be positioned in front of or behind the moving body after the another moving body has performed the lane change from the second lane to the first lane,
in the restricting of the lane change of the moving body, when it is estimated, in the estimating, that the another moving body is expected to be positioned behind the moving body after the another moving body has performed the lane change from the second lane to the first lane, the lane change of the moving body from the first lane to the second lane is restricted if the lane change of the moving body has not reached a first progress level, and
in the restricting of the lane change of the moving body, when it is estimated, in the estimating, that the another moving body is expected to be positioned in front of the moving body after the another moving body has performed the lane change from the second lane to the first lane, the lane change of the moving body from the first lane to the second lane is restricted if the lane change of the moving body has not reached a second progress level that is higher than the first progress level.

* * * * *